April 15, 1969 G. E. PERREAULT 3,439,302

REED RELAY MOUNTING AND CONNECTOR

Filed Nov. 27, 1962

INVENTOR
G. E. PERREAULT
BY John C. Moris
ATTORNEY

United States Patent Office 3,439,302
Patented Apr. 15, 1969

3,439,302

REED RELAY MOUNTING AND CONNECTOR

George E. Perreault, White Plains, N.Y., assignor to Bell Telephone Laboratories, Incorporated, New York, N.Y., a corporation of New York Filed Nov. 27, 1962, Ser. No. 240,354
Int. Cl. H01h 51/20
U.S. Cl. 335—154 4 Claims This invention relates to electromagnetic relays and more particularly to those that employ sealed contact reed switch elements. This invention is especially concerned with the manner of assembling such relays.

In their simplest form, relays of this type usually comprise a support unit, a switching unit, and occasionally, a protective outer cover. The support unit generally includes a mounting member having structural features for holding the switching unit and for facilitating its connection to external electrical circuits. The switching unit basically comprises a switching element and an adjacent operating coil wherein the switching element is activated by flux emanating from the operating coil. The switching element includes a plurality of reed members sealed in operative relation to each other in a glass tube, wherein at least one of the sealed reed members is magnetically sensitive. Further a portion of each reed member protrudes from the sealed glass tube to provide a conducting path from the switch element to an external electrical circuit.

It is a general object of this invention to improve relays of the aforementioned type.

A particular object of this invention is to achieve efficiency in the assembly of such relays.

Still another particular object of this invention is to obtain a basic relay which may be frabricated from standardized components and which may readily be adapted to a wide variety of specialized switching functions.

A feature of this invention is an improved mounting terminal that enables the foregoing objects to be achieved.

In an illustrative embodiment of this invention, an assembled relay comprises three components: a switching unit, a support unit, and an encapsulating potting compound. The switching unit includes a sealed contact reed switch element and an operating coil, both of which are commercially available. The support unit comprises a plurality of metallic electrically conducting mounting terminals firmly affixed to a suitable electrically nonconducting support member such as a polyethylene panel. The encapsulating potting compound surrounds the switching unit and is held against the support unit. The compound is an electrically nonconducting material as, for example, Dow Corning "Silastic."

The switching unit is joined to the support unit by the mounting terminals. Each mounting terminal is L-shaped, and each leg includes a channel-shaped part or trough having a controlled width dimension for accepting conductor leads. By accepting the conducting leads, the terminals precisely locate and firmly hold the components of the switching unit with respect to the support unit while providing an electrically conducting path between the switching unit and external electrical circuits. A potting compound surrounds the switching unit in order to protect the components therein from moisture or damage. As a consequence, the leads from the operating coil are protected and spool heads are rendered unnecessary. Further, the exposed ends of the coil are protected, thereby eliminating the need to coalesce the coil.

A better understanding of this invention may be had from the following detailed description when read in connection with the accompanying drawing in which.

Figure 1:
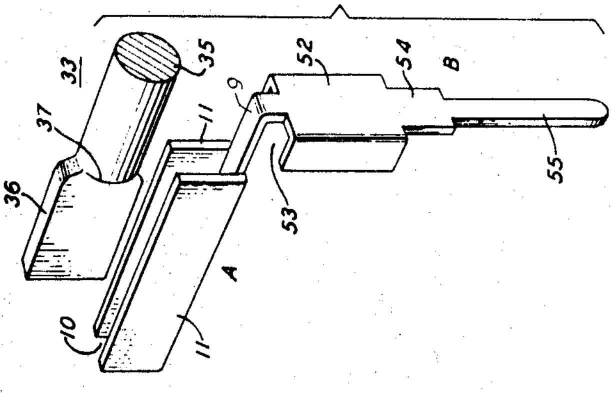
FIG. 1 illustrates in perspective one form of the mounting terminals.

Referring now to the drawings in which the same numbers identify the same elements, a mounting terminal representing one feature of this invention is shown in FIG. 1. The illustrated mounting terminal is L-shaped, and the legs are designated A and B, respectively. Leg A is rigidly joined to leg B by a connector 9.

Leg A includes a channel-shaped part or trough 10 defined by flanges 11 for supporting switching unit 30 and accepting conductor leads therefrom. Switching unit 30 is shown in an embodiment of this invention illustrated in FIG. 3 and comprises an operating coil 31 fitted snugly about a switching element 32. Switching element 32 includes a sealed contact reed switch with protruding leads 33, only one of which is shown. The operating coil 31 also has two leads 34, with only one lead shown. In the switching element 32, each protruding lead 33 includes a cylindrical portion 35 and a flattened portion 36, as illustrated by the portion of the lead 33 shown above the terminal in FIG. 1. The junction of the cylindrical portion 35 and the flattened portion 36 on each lead 33 forms a shoulder 37. The trough 10 is just wide enough to accept the flattened portion 36 of the lead 33. When the flattened portion 36 is properly embraced in trough 10, the shoulder 37 abuts the flanges 11. As a result, motion of the lead 33 embraced in the trough 10 is prevented in one direction axially and in two dimensions laterally. Therefore, the same movement of the switching element 32 to which lead 33 is attached is also prevented.

Figures 4, 5:
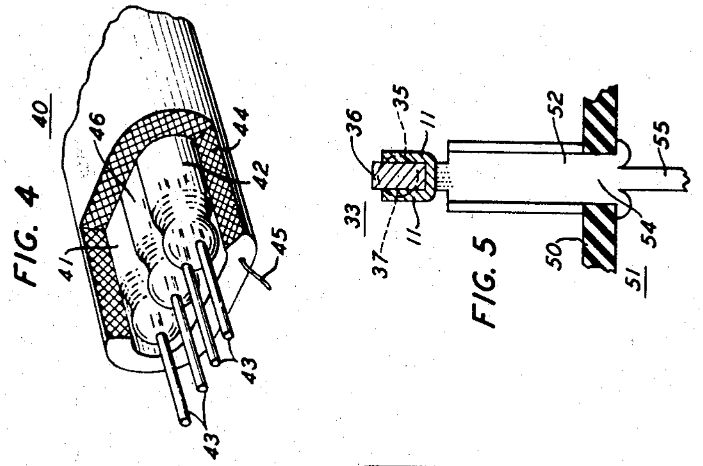
FIG. 4 is an alternate form of a switching unit.
FIG. 5 is a section view of part of a support unit showing a lead held in a mounting terminal fastened to a panel member.
Figure 2:
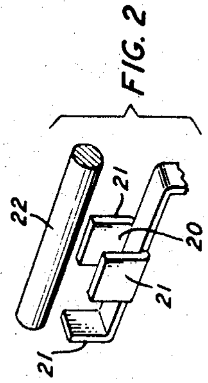
FIG. 2 illustrates in perspective an alternate design for the lead accepting part of the mounting terminal.

Leg A may comprise alternate configurations of the trough defining parts. In FIG. 2, a trough 20 is defined by tabs 21 for use with a round lead 22, a part of which is illustrated. The round lead 22 fits snugly between two of tabs 21 and abuts another. As a result, motion of a switching element from which round lead 22 protrudes is prevented as hereinbefore explained for a lead with a flattened end. The resulting flexibility in the lead accepting characteristic of the mounting terminal permits wide latitude in choice of components for assembly in a switching unit. An example is illustrated in FIG. 4 where a portion of a switching unit 40 is shown. The switching unit 40 includes switching elements 41, 42 and 46, all with round leads 43, surrounded by a snugly fitting operating coil 44 having two leads 45, only one of which is shown. Each switching element may contain different switching functions. For example: switching element 41 may contain "make" contacts while switching element 46 may contain "break" contacts. Further, switching element 42 may contain a contact arrangement permitting a transfer or continuity function such as break-before-make or make-before-break, respectively. As a consequence, relays can be readily assembled from switching units comprising such switching elements for a broad range of switching applications.

Leg B illustrated in FIG. 1 shows terminal parts which permit each terminal to be affixed to a panel in order to form a support unit. The support unit 51 illustrated in FIG. 3 has mounting terminals arranged on panel 50 in such a manner that each terminal embracing a conductor lead 33 cooperates with a counterpart terminal to prevent longitudinal motion of the switch element 32 held therebetween with respect to the support unit 51. Further, all the terminals are oriented in two groups on panel 50 in order to accept the operating coil 31 snugly therebetween. The operatnig coil 31 abuts each terminal at the shoulder 52 shown on leg B in FIG. 1. As a result, the operating coil 31 is also prevented from moving longitudinally with respect to the support unit 51. Therefore, the positions of the switch element 32 and the operating coil 31 with respect to each other are fixed. Further, as can be understood from FIG. 3, a pair of terminals is also included in the terminal arrangement on panel 50 for accepting the leads 34 from the operating coil 31.

Figure 3:
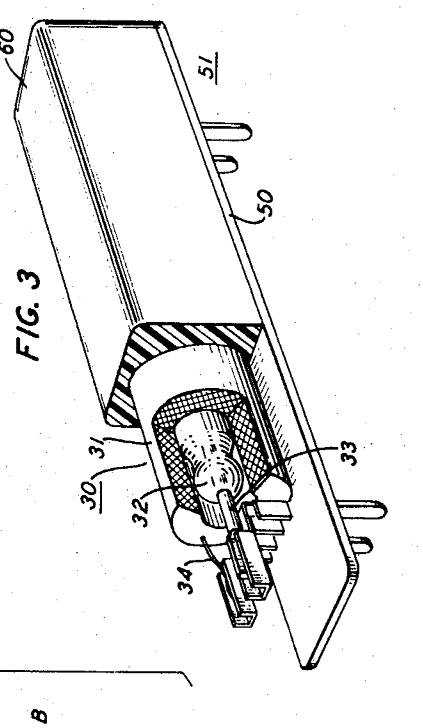
FIG. 3 is a perspective view with parts broken away illustrating a completed relay that shows a switching unit and a support unit encapsulated in a potting compound.

Referring again to FIG. 1, the channel-shaped part 53 of each mounting terminal braces against the support unit, as shown braced against panel 50 in FIG. 3, and imparts vertical rigidity to the entire terminal while controlling the height of trough 10 above the surface against which the terminal braces. Part or blade 54 of each mounting terminal serves to fasten the terminal to the support unit; as, for example, by staking to the panel 50 of support unit 51 illustrated in FIG. 5. Part 55 serves to mechanically join the integrated relay in a circuit application while establishing an electrically conducting path between external electrical circuits and the switching unit. It is important to assure good electrical conductivity between external electrical circuits and the components of the switching unit. In FIG. 3, each lead 33 and 34 is firmly fastened in its terminal trough 10 by soldering, crimping or any other convenient method. As a result of the firm connection between the conductor leads and the mounting terminals, some terminals rigidly hold the switching unit joined to the support unit while other terminals serve in lieu of coil spool heads as coil lead terminations. Therefore, spool heads have been rendered an unnecessary component in the final relay assembly.

It will be readily understood that applicant's novel mounting terminal permits relays to be assembled from individual switching and support unit subassemblies. Each switching unit subassembly may include a variety of combinations and arrangements of switching components. Further, support unit subassemblies may easily be fabricated to accept any switching unit. As completed relays can be assembled in a standard manner from matched subassemblies regardless of component content, a variety of switching functions can be designed for completed relays without affecting procedures for final assembly.

Although the integrated relay assembled from a switching unit and support unit is structurally strong enough to serve in most, if not all, applications, it is advantageous to encapsulate the relay in a potting compound 60 as illustrated in FIG. 3. The potting compound 60 surrounds the switching unit 30 and may be applied as, for example, by dipping or moulding. When cured or hardened, the potting compound 60 is held against a support unit by the leg A, illustrated in FIG. 1, of each terminal. An additional advantage is gained by the use of potting compound in that it eliminates the necessity to coalesce the ends of the operating coil. In the relay illustrated in FIG. 3, the exposed portions of the operating coil 31 are completely surrounded, protected and insulated by the potting compound 60. In addition, the potting compound 60 affords each operating coil lead 34 a further measure of protection from external damage.

While the embodiments of the present invention as herein disclosed constitute preferred forms, it is to be understood that other forms within the scope of the foregoing may easily be adopted by those skilled in the art.

What is claimed is:

1. A relay comprising:

switching means including a coil and a switch;

support means; and a plurality of electrically conducting terminals interconnecting said support means and said switching means, each of said terminals comprising means for locating said coil on said support means, locating means for locating said switch within said coil, said locating means including one end of a channel-shaped first member, spacing means for spacing said switch a predetermined distance away from said support means, said spacing means including one end of a second member joined to said first member means for holding said switching means against substantially all movement, and means for supporting said switch and electrically terminating said switching means.

2. A relay in accordance with claim 1 wherein said means for holding said switching means against substantially all movement comprises a blade rigidly joined to said second member and a connector rigidly interconnecting said second member to said one end of a channel-shaped first member.

3. A relay comprising:

support means;

switching means including a coil and a switch, said switching means mounted on said support means; and a plurality of electrically conducting terminals interconnecting said support means and said switching means, each of said terminals comprising rigidly interconnected first and second members disposed at substantially right angles to each other, said first member comprising a channel-shaped trough of predetermined width, and said second member including a portion abutting said coil and a portion displaced a predetermined distance from said first member and in abutment with said support means.

4. A relay comprising:

switching means including a coil and a switch;

support means; and a plurality of electrically conducting terminals interconnecting said switching and said support means, each of said termnials comprising a channel-shaped first member joined to a channel-shaped second member, said first and second members being disposed at substantially right angles to each other and said second member including a blade and a shoulder, said blade for joining said second member to said support means and said shoulder for abutting said coil.

References Cited

UNITED STATES PATENTS

| | | | |
|---|---|---|---|
| 2,985,733 | 5/1961 | Kamps | 335—202 |
| 3,035,239 | 5/1962 | Ringland | 172—52 |
| 2,978,556 | 4/1961 | Lohs et al. | 335—137 |
| 3,087,030 | 4/1963 | Shebanow | 335—161 X |
| 3,215,794 | 11/1965 | Zielinski | 335—172 |
| 1,498,091 | 6/1924 | Getchell | 200—166 |
| 3,027,440 | 3/1962 | Daly | 200—166 |
| 3,118,998 | 1/1964 | Masnex et al. | 200—166 |
| 3,134,867 | 5/1964 | Winship | 335—182 |
| 3,147,060 | 9/1964 | Jensen et al. | 339—220 X |

OTHER REFERENCES

"Multiple Reed Switch" by P. S. Bolan, IBM Technical Disclosure Bulletin, volume 4, No. 7, December 1961.

BERNARD A. GILHEANY, *Primary Examiner.*

R. N. ENVALL, Jr., *Assistant Examiner.*

U.S. Cl. X.R.

335—152